(12) United States Patent
Atohira

(10) Patent No.: US 11,192,249 B2
(45) Date of Patent: Dec. 7, 2021

(54) SIMULATION DEVICE FOR ROBOT

(71) Applicant: FANUC CORPORATION, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 361 days.

(21) Appl. No.: 16/377,250

(22) Filed: Apr. 8, 2019

(65) Prior Publication Data

US 2019/0329411 A1 Oct. 31, 2019

(30) Foreign Application Priority Data

Apr. 25, 2018 (JP) .............................. JP2018-084230

(51) Int. Cl.
*B25J 9/16* (2006.01)
*B25J 3/00* (2006.01)
*G02B 27/01* (2006.01)

(52) U.S. Cl.
CPC .............. *B25J 9/1671* (2013.01); *B25J 3/00* (2013.01); *B25J 9/1605* (2013.01); *B25J 9/1664* (2013.01); *G02B 27/0172* (2013.01)

(58) Field of Classification Search
CPC ................. B25J 9/16; B25J 3/00; G02B 27/01
See application file for complete search history.

(56) References Cited

U.S. PATENT DOCUMENTS

| | | | |
|---|---|---|---|
| 9,919,427 B1 | 3/2018 | Guilbert | |
| 10,362,299 B1* | 7/2019 | Niemeyer | G06F 3/012 |
| 2016/0257000 A1* | 9/2016 | Guerin | B25J 9/1605 |
| 2016/0266645 A1 | 9/2016 | Marozau et al. | |
| 2017/0075116 A1* | 3/2017 | Gardiner | G06T 7/73 |
| 2017/0368691 A1* | 12/2017 | Li | G05D 1/0223 |
| 2017/0372139 A1 | 12/2017 | Thomasson et al. | |
| 2018/0231973 A1* | 8/2018 | Mattingly | B25J 9/1689 |

FOREIGN PATENT DOCUMENTS

| | | |
|---|---|---|
| JP | H966476 A | 3/1997 |
| JP | 2004243516 A | 9/2004 |
| JP | 20103312 A | 1/2010 |
| JP | WO2011080882 A1 | 5/2013 |
| JP | 2017-24113 A | 2/2017 |
| JP | 201794466 A | 6/2017 |
| JP | 2017100206 A | 6/2017 |
| JP | 2017100234 A1 | 6/2017 |
| KR | 101850410 B1 | 4/2018 |

* cited by examiner

*Primary Examiner* — Kira Nguyen
(74) *Attorney, Agent, or Firm* — Hauptman Ham, LLP

(57) ABSTRACT

Provided is a simulation device for a simulation of a cooperative task carried out cooperatively by a cooperative robot and a person, and the simulation device includes a head mounting-type display device to be mounted on an operator to simulatively carry out the cooperative task, a detecting section configured to detect a position of the operator in a real space, a three-dimensional model display section configured to cause an image in which a robot system model including a cooperative robot model is arranged in a three-dimensional virtual space to be displayed on the head mounting-type display device, and a simulation execution section configured to simulatively operate the cooperative robot model in the three-dimensional virtual space based on an operation program of the cooperative robot to carry out the cooperative task and the detected position of the operator.

9 Claims, 6 Drawing Sheets

SIMULATION DEVICE FOR ROBOT

RELATED APPLICATIONS

The present application claims priority of Japanese Application Number 2018-084230, filed Apr. 25, 2018, the disclosure of which is hereby incorporated by reference herein in its entirety.

BACKGROUND OF THE INVENTION

1. Field of the Invention

The present invention relates to a simulation device configured to perform a simulation of a cooperative task carried out cooperatively by a cooperative robot and a person.

2. Description of the Related Art

Systems configured to perform a simulation while disposing, on a screen, a cooperative robot model, a workpiece model, a person model, and a peripheral device model that respectively represent a cooperative robot, a workpiece, a person and a peripheral device in three dimensions are known (e.g., see JP 2017-024113 A).

SUMMARY OF THE INVENTION

A simulation device disclosed in JP 2017-024113 A is configured to perform a simulation while disposing, in a virtual space, models of a robot, a workpiece, a peripheral device and a person. In a simulation of a cooperative task carried out cooperatively by a cooperative robot and a person, it is desirable that a risk of the cooperative robot and the person making contact with each other, a risk of the cooperative robot and the person being excessively close to each other, and the like are appropriately found by the simulation.

An aspect of the present disclosure is a simulation device for a simulation of a cooperative task carried out cooperatively by a cooperative robot and a person, and the simulation device includes a head mounting-type display device to be mounted on an operator to simulatively carry out the cooperative, task; a detecting section configured to detect a position of the operator in a real space; a three-dimensional model display section configured to cause an image in which a robot system model including a cooperative robot model is arranged in a three-dimensional virtual space to be displayed on the head mounting-type display device; and a simulation execution section configured to simulatively operate the cooperative robot model in the three-dimensional virtual space based on an operation program of the cooperative robot to carry out the cooperative task and a position of the operator detected by the detecting section.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
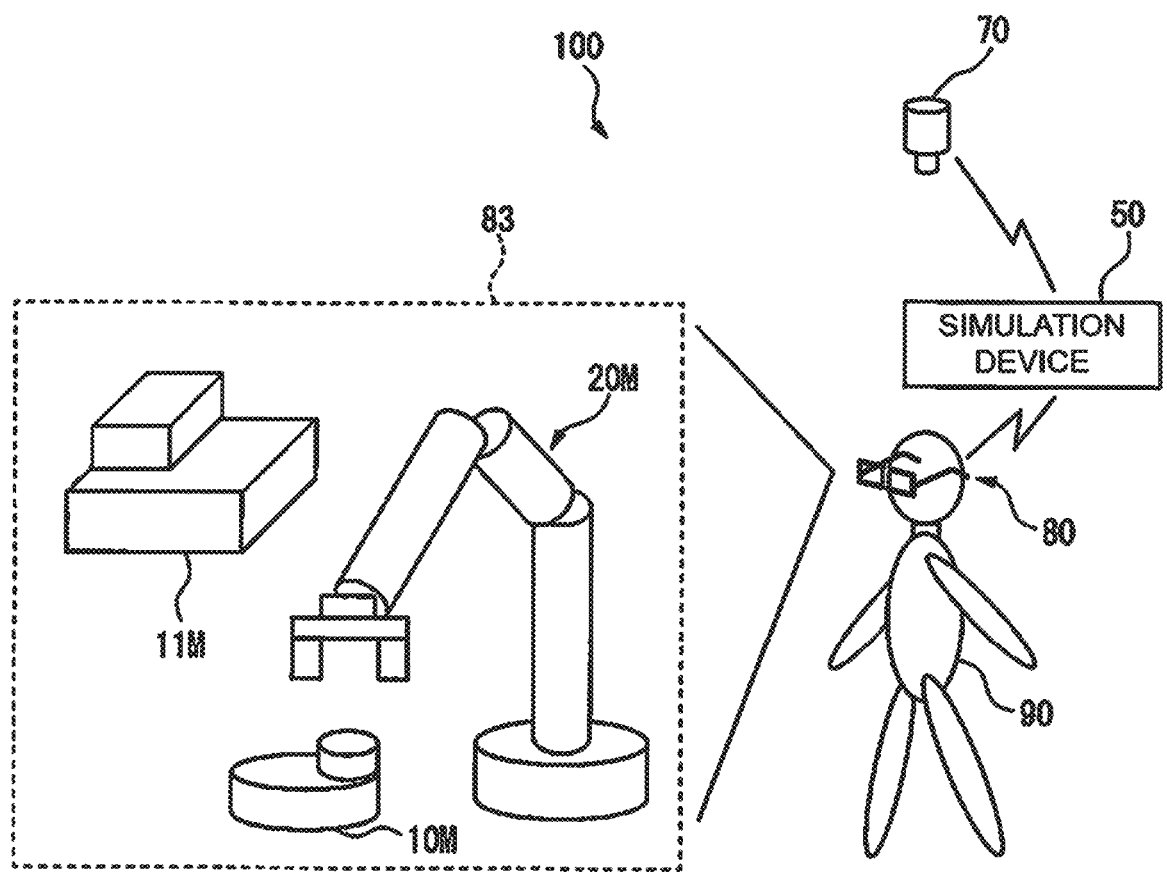
FIG. 1 is a configuration diagram illustrating an overall configuration of a robot simulation system according to an embodiment.

Embodiments of the present invention will be described below with reference to the accompanying drawings. Throughout the drawings, corresponding components are denoted by common reference numerals. To make it easy to understand the drawings, scales of the drawings are appropriately changed. Note that modes illustrated in the drawings are merely examples to implement the invention, and the invention is not limited to the modes illustrated.

FIG. 1 is a configuration diagram illustrating an overall configuration of a robot simulation system 100 according to an embodiment. The robot simulation system 100 is a system configured to perform a simulation of a cooperative task carried out by a cooperative robot and a person. As illustrated in FIG. 1, the robot simulation system 100 includes a head-mounted display 80 as a head mounting-type display device to be mounted on the head of an operator 90, a simulation device 50 configured to perform a simulation operation, and a detection device 70 configured to detect a position, movement, and the like of the operator 90. The head-mounted display 80 and the detection device 70 are connected to the simulation device 50 by wireless connection or wired connection.

The simulation device 50 has three-dimensional model data of a robot system including a cooperative robot, a workpiece and a peripheral device, and has a function to generate an image in which the robot system model is arranged in a three-dimensional virtual space and make the generated image be displayed on a display section 83 (see FIG. 2) of the head-mounted display 80. Within a frame boarder of broken lines in FIG. 1, an example of an image is illustrated in which a cooperative robot model 20M, a workpiece model 10M, and a peripheral device model 11M are displayed as pseudo three-dimensional objects in a virtual space (the display section 83 of the head-mounted display 80). The simulation device 50 can be constituted of a general computer including a CPU, a ROM, a RAM, a storage device, a wired or wireless network interface, an external device interface, an operation section, a display section, and the like. As will be described below, various kinds of functions of the simulation device 50 can be achieved by the CPU of the simulation device 50 executing various kinds of programs such as a simulation program. The detection device 70 detects a position, movement, and the like of the operator 90 in a real space. This configuration makes it possible for the simulation device 50 to determine a relative positional relationship between the cooperative robot model 20M and the operator 90 in the virtual space in accordance with the position, movement, and the like of the operator 90 in the real space, and generate a display image of the robot system model in accordance with the determined relative positional relationship. Accordingly, the operator 90 can approach the robot system model or step away from the robot system model in the virtual space displayed on the head-mounted display 80 by moving in the real space.

Figure 2:
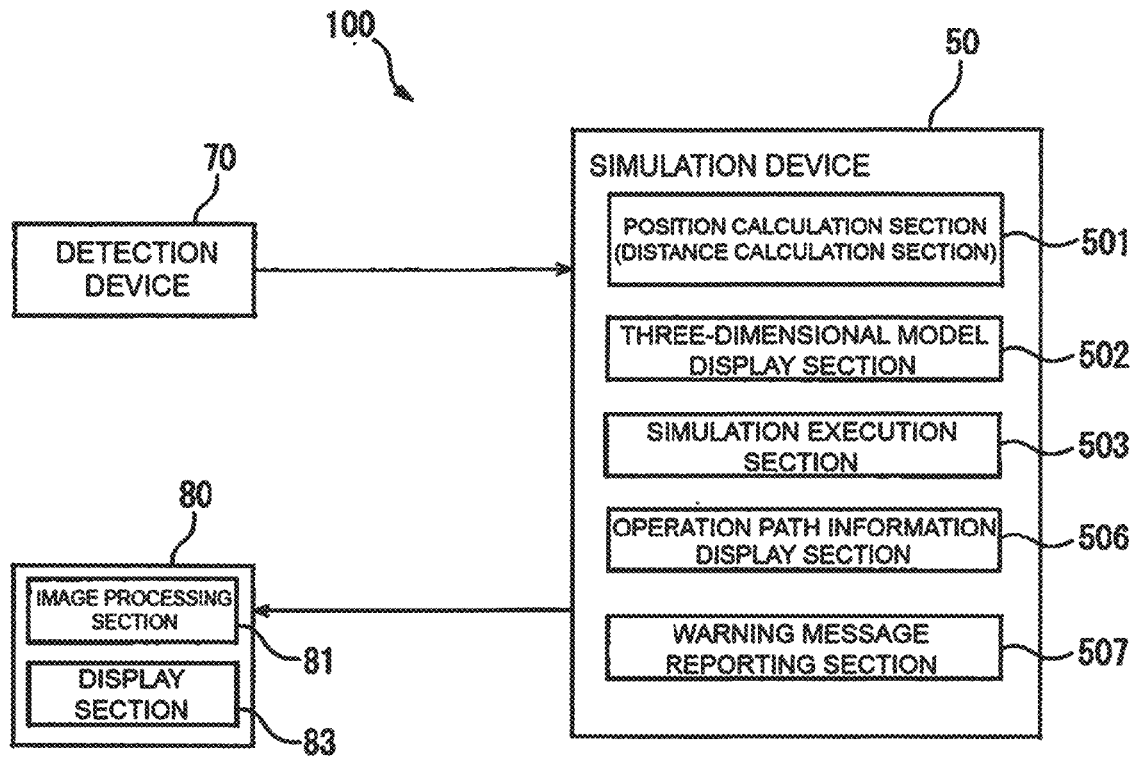
FIG. 2 is a function block diagram of a robot simulation system.

FIG. 2 is a function block diagram of the robot simulation system 100. As illustrated in FIG. 2, the simulation device 50 includes a position calculation section 501, a three-dimensional model display section 502, a simulation execution section 503, an operation path information display section 506, and a warning message reporting section 507.

The detection device 70 is, for example, a vision sensor configured to visually detect the operator, and has a function to capture an image of the operator 90 and detect the position, movement, and the like of the operator 90. Specifically, the detection device 70 has a function to analyze the captured image and detect the position, movement and the like of the operator 90, and the movement of the hands of the operator 90 in the captured image. As a method for detecting the positions of a human body, hands, and the like in the image, various known detection methods in the art, such as a method of performing matching with a model image, can be used. The detection device 70 supplies the simulation device 50 with the detected position, movement, and the like of the operator 90.

The position calculation section 501 calculates relative positions of the cooperative robot model 20M and the operator 90 in the virtual space based on the position, movement, and the like of the operator 90, supplied from the detection device 70, in the real space. The position calculation section 501 also has a function as a distance calculation section configured to calculate a relative distance between the cooperative robot model 20M and the operator 90 in the virtual space. The cooperative robot model 20M, the workpiece model 10M, and the peripheral device model 11M are arranged, by the three-dimensional model display section 502, at prescribed positions in a coordinate system set in the virtual space. The position calculation section 501 converts a position of the operator 90 supplied from the detection device 70 (a position in a coordinate system set in the real space) to a position in the coordinate system set in the virtual space, thereby calculating the relative positions of the cooperative robot model 20M and the operator 90 in the virtual space.

The three-dimensional model display section 502 generates image data in which the cooperative robot model 20M, the workpiece model 10M, and the peripheral device model 11M are arranged in the virtual space, based on the relative positions of the operator 90 and the cooperative robot model 20M in the virtual space calculated by the position calculation section 501. The three-dimensional model display section 502 sends the generated image data to the head-mounted display 80, and causes an image based on the image data (an image in which the robot system model is arranged in the virtual space) to be displayed on the display section 83 of the head-mounted display 80.

The simulation execution section 503 executes the simulation operation of the robot system model. In this description, the simulation operation is an operation to simulatively operate the robot system model in accordance with teaching input by an operation program or an operator. The simulation execution section 503 acquires, from the position calculation section 501, the relative positions of the operator 90 and the cooperative robot model 20M in the virtual space, and use them in the simulation operation of the task cooperatively carried out. By using the relative positions, it is also possible to display a warning message in the virtual space in a case where the operator 90 has excessively become close to the cooperative robot model 20M during the simulation operation.

Further, the simulation execution section 503 may give, by using the relative positions of the operator 90 and the cooperative robot model 20M, at least one of the following safety operations to the cooperative robot model 20M.

(M1) In a case where the operator 90 becomes close to the cooperative robot model 20M during the simulation operation, an operating speed of the cooperative robot model 20M is lowered.

(M2) In a case where the operator 90 makes contact with the cooperative robot model 20M during the simulation operation, the cooperative robot model 20M is stopped.

(M3) In a case where the operator 90 pushes the cooperative robot model 20M during the simulation operation, the cooperative robot model 20M is operated in accordance with the movement of the operator 90.

The above-mentioned operations can be implemented by analyzing the movement of the operator 90 with the captured image thereof by the detection device 70 and detecting the movement of the hands of the operator 90.

The operation path information display section 506 acquires, from the operation program, operation path information, which is information associated with the operation of the cooperative robot model 20M. The operation path information may contain operation records of the cooperative robot model 20M. The operation path information display section 506 has a function to make the operation path information displayed as an image in the virtual space (the display section 83 of the head-mounted display 80). As an example, before the cooperative robot model 20M performs a next operation (e.g., immediately before performing the next operation), the operation path information display section 506 causes the operation path information of the next operation to be displayed. This makes it possible for the operator 90 to know an action that the cooperative robot model 20M takes next, and recognize a task to carry out next.

The warning message reporting section 507 warns the operator 90 that the operator 90 is too close to the cooperative robot model 20M based on a relative distance between the operator 90 and the cooperative robot model 20M in the virtual space. For example, in a case where the relative distance between the cooperative robot model 20M and the operator 90 becomes equal to or smaller than a predetermined value in a virtual space, the warning message reporting section 507 causes a warning message to be displayed on the display section 83 of the head-mounted display 80. This kind of warning may also be given by a warning tone. In this case, the warning message reporting section 507 may make the warning tone emitted from a speaker disposed in the head-mounted display 80 or the simulation device 50.

The head-mounted display 80 includes an image processing section 81 configured to perform image processing in which image data supplied from the three-dimensional model display section 502 is processed and displayed on the display section 83, and the display section 83 disposed corresponding to both the eyes of the operator 90. As an example, the image processing section 81 generates a binocular parallax image and display it on the display section 83. This makes it possible for the operator 90 to recognize the robot system model as a pseudo three-dimensional object.

Figure 3:
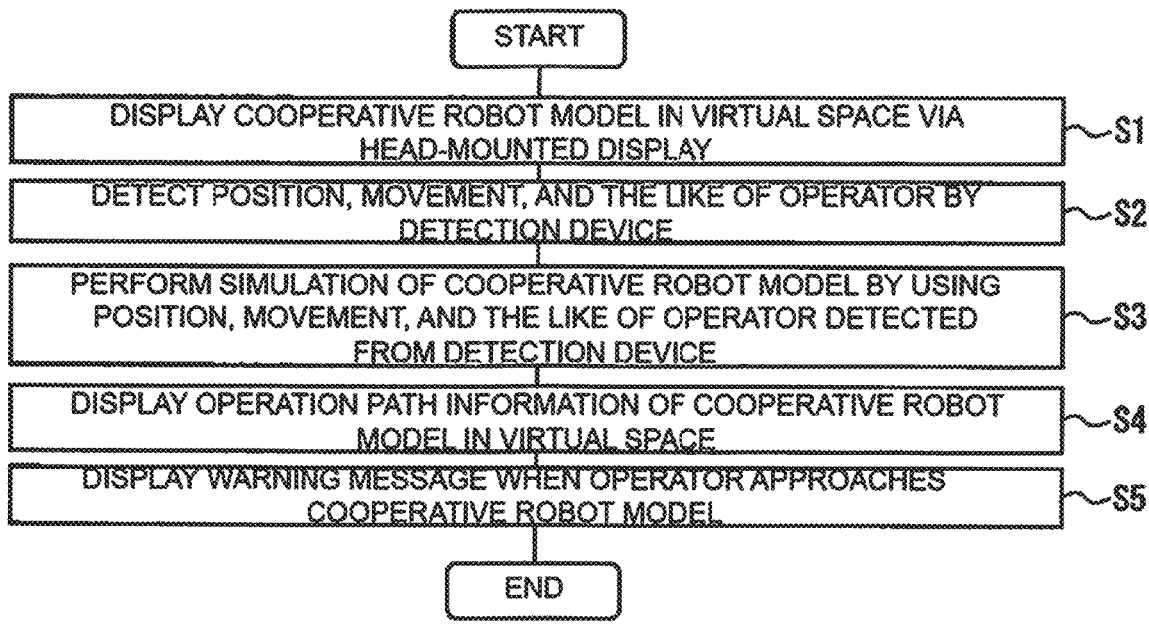
FIG. 3 is a flowchart of a simulation operation according to the present embodiment.

FIG. 3 is a flowchart of the simulation operation according to the present embodiment. The simulation operation in FIG. 3 can be achieved by the CPU of the simulation device 50 executing a simulation program stored in the storage device inside the simulation device 50. The simulation program can be stored in various kinds or computer-readable storage media (a ROM, a RAM, a flash memory, an HDD, a CD-ROM, a DVD-ROM, etc.). As an example, the simulation operation illustrated in FIG. 3 is performed to find improvement to the operation program, the cooperative task, or the like by operating a previously-prepared temporary operation program of the cooperative robot in the robot simulation system 100 in FIG. 1. The cooperative robot model 20M may be set in such a manner as to perform the above-discussed safety operations (M1) to (M3) in accordance with situations during the simulation operation.

When the simulation device 50 is operated and the simulation program is started, the cooperative robot model 20M the workpiece model 10M, and the peripheral device model 11M are displayed first in the virtual space (the display section 83 of the head-mounted display 80) by the three-dimensional model display section 502 (Step S1). Here, such an image that is illustrated within the broken-line frame boarder in FIG. 1 is displayed on the display section 83 of the head-mounted display 80.

Figure 4:
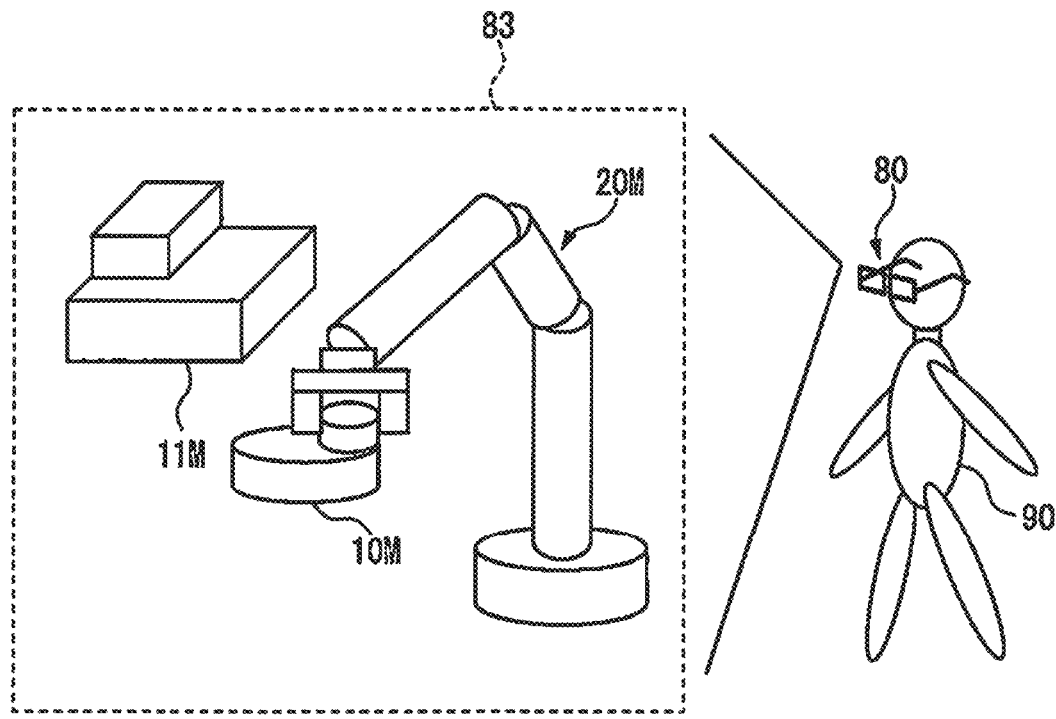
FIG. 4 is a diagram illustrating a displayed state of a robot system model in a virtual space at a time when a simulation operation is started.

Next, the detection device 70 starts the operation of detecting a position, movement, and the like of the operator 90 (Step S2). The position, movement, and the like of the operator 90 detected by the detection device 70 are supplied to the simulation device 50. Next, the simulation execution section 503 starts the simulation operation by using the position, movement, and the like of the operator 90 having been detected by the detection device 70 (Step S3). In the simulation operation, the cooperative robot model 20M is operated according to the operation program. The operator 90 simulatively carries out a task of a person in the cooperative task. Here, as an example of the cooperative task, the cooperative robot model 20M carries out an operation to transport the workpiece model 10M and deliver it to the person, and the operator 90 carries out an operation to receive the workpiece model 10M from the cooperative robot model 20M. FIG. 4 illustrates a displayed state of the robot system model in the virtual space at a time when the simulation operation is started. As illustrated in FIG. 4, on the display section 83 of the head-mounted display 80 mounted on the operator 90, an image is displayed depicting a state in which the robot model 20M has held the workpiece model 10M and has just started to transport it. Following the task procedure, the operator 90 takes an action to receive the workpiece model 10M from the robot model 20M.

During the simulation operation being performed, the operation path information display section 506 generates an image indicating operation path information of the cooperative robot model 20M based on the relative positions of the operator 90 and the cooperative robot model 20M in the virtual space, and makes the generated image be displayed in the virtual space (Step S4). By displaying the operation path information, it is possible for the operator 90 to grasp how the cooperative robot model 20M will move next. Therefore, the simulation can be appropriately performed even if the operator 90 does not necessarily grasp the task procedure. An example of display of the operation path information will be described below.

Figure 5:
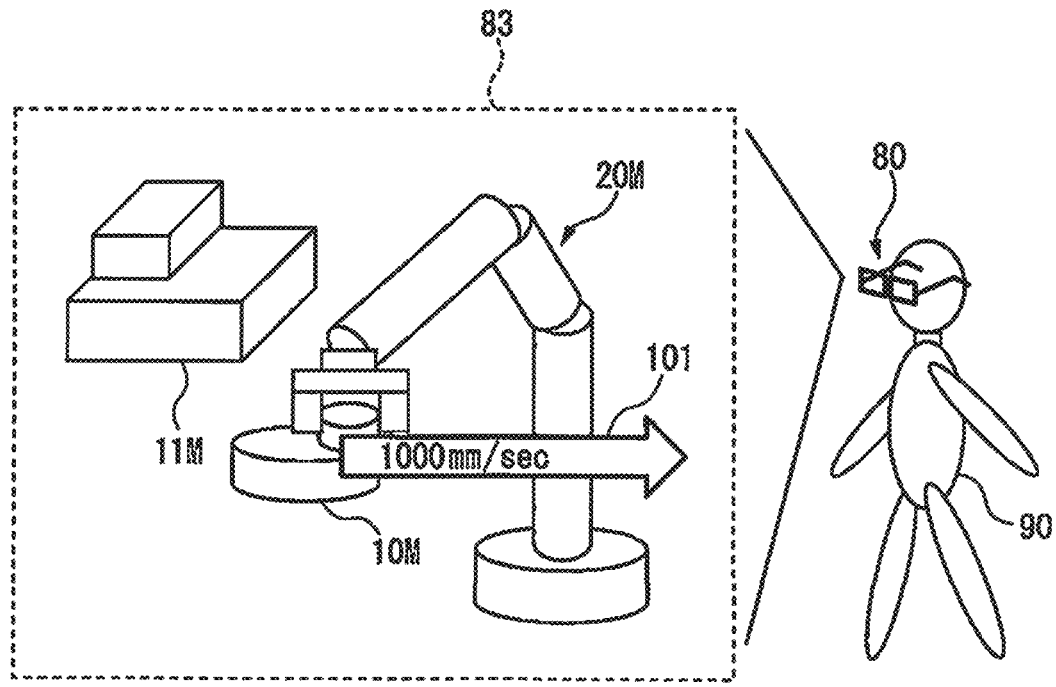
FIG. 5 is a diagram illustrating an example in which an image depicting a next operation direction and a next speed of a cooperative robot model is displayed as operation path information.

FIG. 5 illustrates an example in which an image 101 depicting a next operation direction and a next speed of the cooperative robot model 20M is displayed as the operation path information. As an example, the image 101 is displayed immediately before the cooperative robot model 20M having just held the workpiece model 10M starts to move. This makes it possible for the operator 90 to instantly grasp in which direction and at what speed the cooperative robot 20M operates next.

Figure 6:
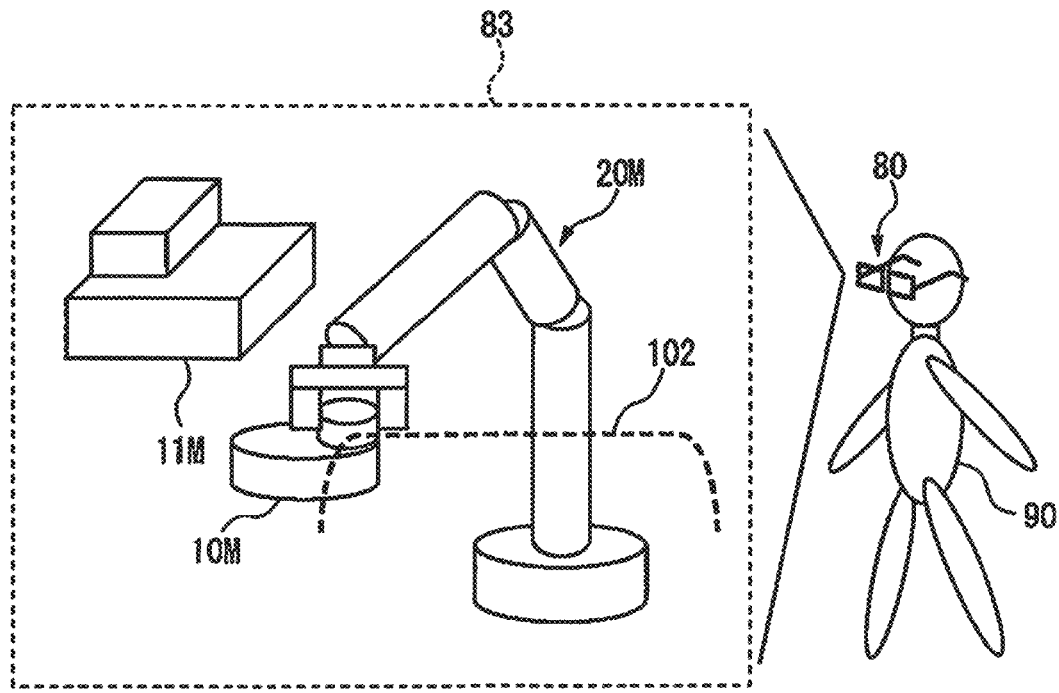
FIG. 6 is a diagram illustrating an example in which an operation trajectory depicting a next operation of a cooperative robot model is displayed as operation path information.

FIG. 6 illustrates an example in which an operation trajectory 102 depicting the operation of the cooperative robot model 20M is displayed as operation path information. As an example, the operation trajectory 102 is displayed immediately before the cooperative robot model 20M starts to move or during the cooperative robot model 20M moving. This makes it possible for the operator 90 to grasp the whole trajectory before the cooperative robot 20M starts to operate.

Figure 7:
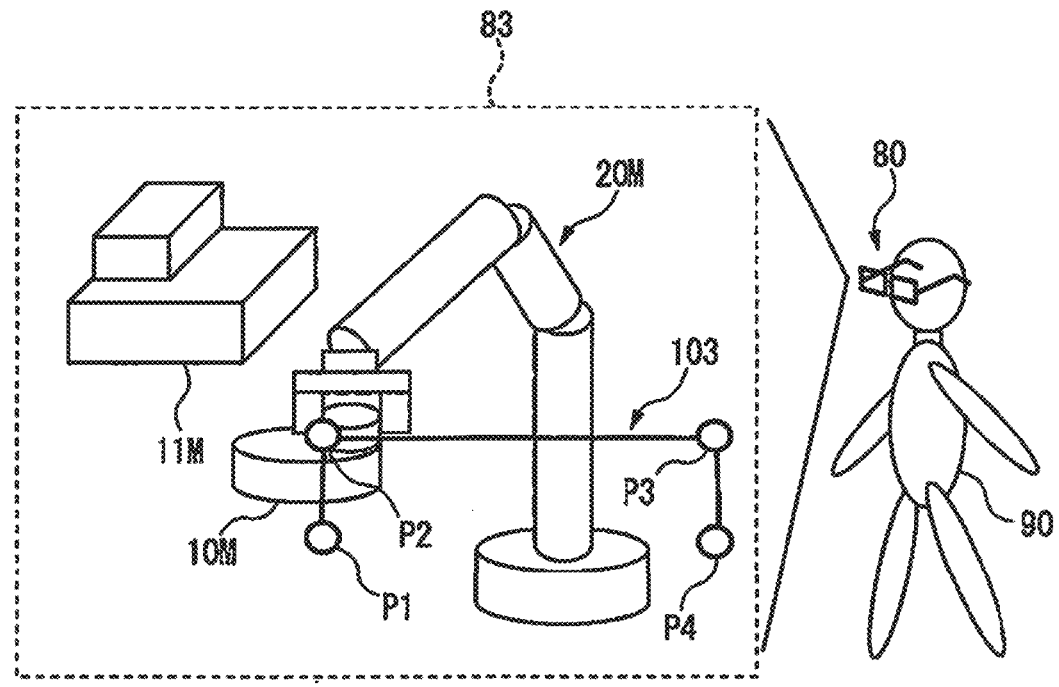
FIG. 7 is a diagram illustrating an example in which an image graphically depicting an operation program (teaching points) of a cooperative robot model is displayed as operation path information.

FIG. 7 illustrates an example in which an image 103 graphically depicting the operation program (teaching points) of the cooperative robot model 20M is displayed as operation path information. P1 to P4 in the image 103 denote teaching points, and lines connecting the teaching points from P1 to P4 represent a path. As an example, the image 103 is displayed immediately before the cooperative robot model 20M starts to move or during the cooperative robot model 20M moving. This makes it possible for the operator 90 to ascertain the whole path before the cooperative robot model 20M starts to operate.

Figure 8:
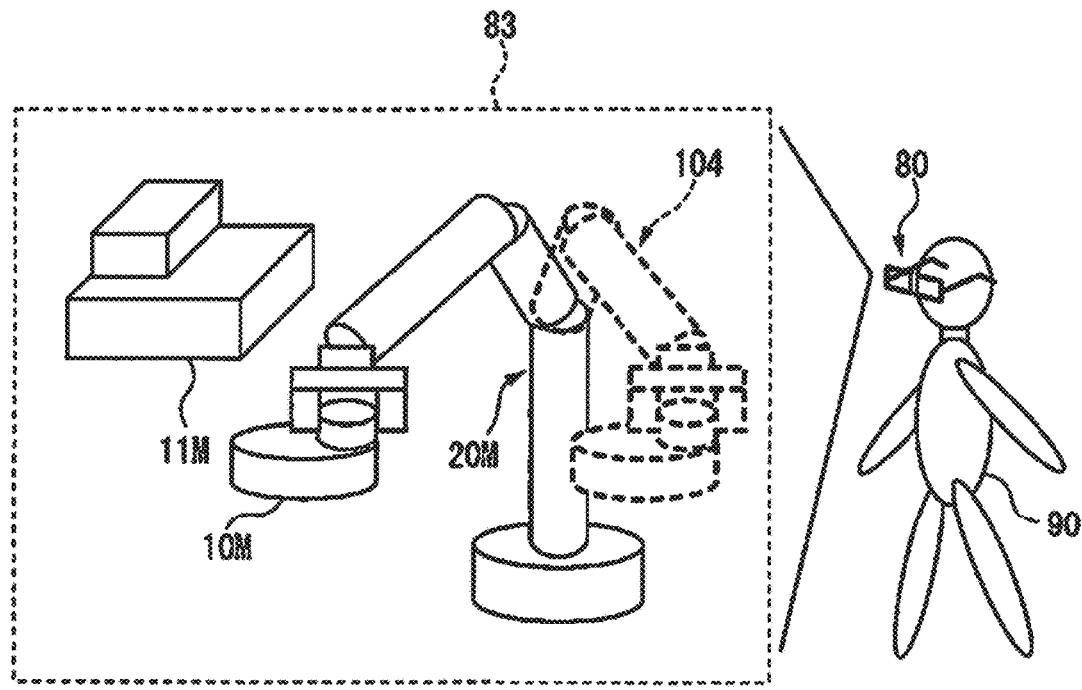
FIG. 8 is a diagram illustrating an example in which a preview image depicting a next operation of a cooperative robot model is displayed as operation path information.

FIG. 8 illustrates an example in which a preview image 104 depicting a next operation of the cooperative robot model 20M is displayed as operation path information. The preview image 104 is a pseudo image of the cooperative robot model 20M arranged at the next operation position of the cooperative robot model 20M. As an example, the preview image 104 is displayed immediately before the cooperative robot model 20M having held the workpiece model 10M starts to move. This makes it possible for the operator 90 to appropriately recognize the next operation to be carried out by the cooperative robot model 20M. A moving picture in which the robot model 20M moves to its next position may be displayed as a preview image.

Figure 9:
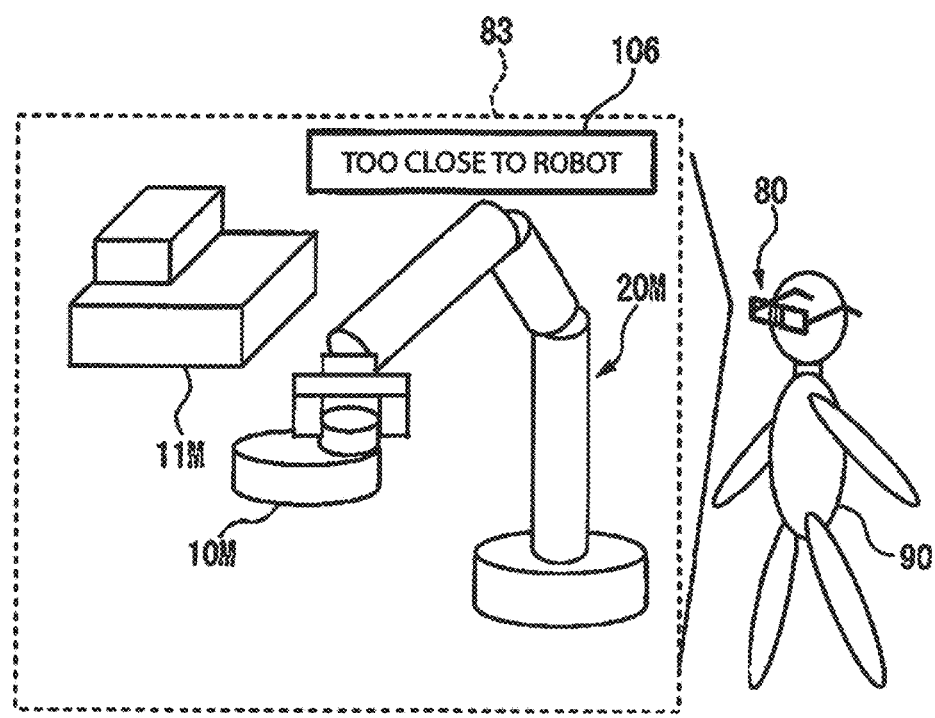
FIG. 9 is a diagram illustrating a state in which a warning message is displayed in a case where an operator has excessively approached a robot model during a simulation operation.

Returning to the description of FIG. 3, in a case where the operator 90 has excessively become close to the cooperative robot model 20M during the simulation operation (i.e., in a case where a relative distance between the cooperative robot model 20M and the operator 90 becomes equal to or smaller than a predetermined value in the virtual space), the warning message reporting section 507 displays a warning message (Step S5). FIG. 9 illustrates an example of display of warning message information. In the example in FIG. 9, a warning message 106 along with the image of the robot system model is displayed on the display section 83 of the head-mounted display 80. By displaying this kind of warning message in the simulation operation, it is possible to prevent a situation in which the operator 90 and the cooperative robot model 20M performing the simulation make contact with each other, become close to each other, or the like.

Since the position of the operator 90 in the virtual space is grasped during the simulation operation, the simulation execution section 503 may carry out such a process in the simulation operation that confirms, when the cooperative robot model 20M transports the workpiece model 10M to a destination, whether the operator 90 is present in a position where the operator 90 can receive the workpiece model 10M, for example. Alternatively, in a case where the cooperative task includes an operation in which the cooperative robot model 20M receives the workpiece model 10M from the operator 90, the simulation execution section 503 may confirm whether the operator 90 is present in a position where the operator 90 can deliver the workpiece model 10M when the cooperative robot model 20M performs an operation to receive the workpiece model 10M. In other words, the simulation execution section 503 may carry out a process of the confirmation in consideration of whether or not the cooperative operation of the operator 90 and the operation based on the operation program of the cooperative robot model 20M cooperate with each other without difficulty.

The risk data of contact between the cooperative robot model 20M and the operator, or the like having been found by the simulation operation as discussed above, can be used for the change of the operation program, the review of the task procedure, or the like. For example, in order to prevent the contact between the cooperative robot model 20M and the operator, it can be considered to change the operation program (teaching points), add a procedure for awaiting the movement of the cooperative robot to the task procedure of the operator, or the like. Alternatively, it can also be considered to review the arrangement of the peripheral device, the workpiece, or the like. The simulation execution section 503 may include a function to automatically change the operation path of the cooperative robot model 20M in such a manner as to prevent the contact between the operator 90 and the cooperative robot model 20M, for example, based on the relative distance between the operator 90 and the cooperative robot model 20M. Further, equal to or more than two of the images among the above-described image 101 (the operation direction and speed), the operation trajectory 102, the image 103 (an operation program) and the preview image 104 of the operation path information, may be simultaneously displayed.

As described thus far, according to the present embodiment, since the simulation can be performed while the operator experiencing a task that is cooperatively carried out by a person and a cooperative robot in a pseudo manner, it is possible to more efficiently prepare an appropriate operation program, a task procedure, and the like.

While the invention has been described with reference to specific embodiments, it will be understood, by those skilled in the art, that various changes or modifications may be made thereto without departing from the scope of the claims described later.

Figure 10:
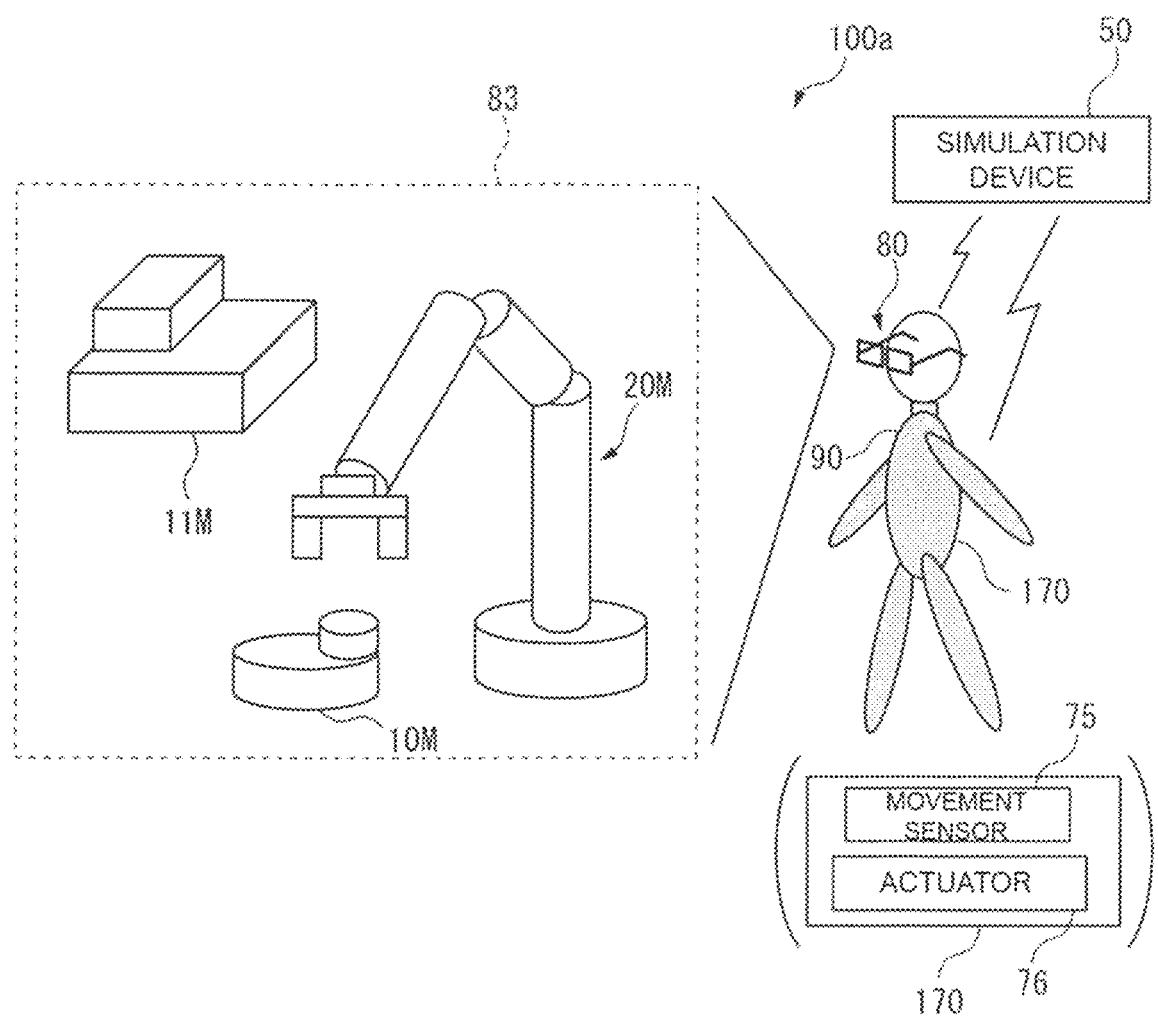
FIG. 10 is a configuration diagram illustrating a configuration of a robot simulation system in a case where a clothing-type detection device is used as a detection device to detect a position, movement, and the like of the operator.

Although, in the above-described embodiment, an example in which a vision sensor is used as a detection device configured to detect the position, movement, and the like of the operator 90 is cited, the detection device is not Limited to such example. FIG. 10 is a configuration diagram illustrating a configuration of a robot simulation system 100a in a case where a clothing-type detection device 170 is used as a detection device configured to detect the positon, movement, and the like of the operator 90. Note that in FIG. 10, a function block diagram of the clothing-type detection device 170 is also illustrated in parentheses for reference. The robot simulation system 100a has the same configuration as that of the robot simulation system 100 except that the clothing-type detection device 170 is used as a detection device configured to detect the positon, movement, and the like of the operator 90. The clothing-type detection device 170 has a configuration in which, for example, a movement sensor 75 constituted of an acceleration sensor, an angular speed sensor, or the like is disposed on each part of the device corresponding to a plurality of parts of the body (the fingers, arms, torso, legs, etc.), and supplies information of the movement, position, and the like of each of the parts of the body of the operator 90 captured by each movement sensor 75 to the simulation device 50 through wireless communication. Also in the case where the operator 90 wears the above-described clothing-type detection device 170, the simulation operation described in FIG. 3 can be similarly performed as in the case of the embodiment described above. Similar effects to the above-mentioned embodiment can be obtained in the case of the robot simulation system 100a as well.

The clothing-type detection device 170 may be configured to include a drive mechanism by an electric actuator 76 disposed on each position of the device corresponding to a plurality of operation parts of the body (e.g., a drive mechanism by an electric actuator assisting the movement of each joint of the body). In this case, when the contact between a body part of the operator 90 and the cooperative robot model 20M in the virtual space is detected, the clothing-type detection device 170 can generate a load that is exerted on the movement of the operator 90 by actuating the electric actuator 76 present at a position corresponding to the above body part. For example, when the operator 90 performs an operation to push the cooperative robot model 20M by hand, the clothing-type detection device 170 may apply a load to the movement of the hand of the operator 90 by actuating the electric actuator 76 for the part on the hand of the operator 90. As an example, based on the position of the operator 90 in the three-dimensional virtual space, the simulation execution section 503 may send a detection signal to the clothing-type detection device 170 in the case where the contact between a body part of the operator 90 and the cooperative robot model 20M is detected in the three-dimensional virtual space. In response to the detection signal from the simulation execution section 503, the clothing-type detection device 170 generates a load that is exerted on the movement of the operator 90 by actuating the electric actuator 76 present at a position corresponding to the body part.

The robot simulation system 100 illustrated in FIG. 1 can also be used in such a simulation operation that an operation program is prepared by the operator 90 performing teaching input with respect to the cooperative robot model 20M. For example, the configuration may be such that an external controller which can be operated while being held in the hand of the operator 90 is connected to the simulation device 50. In this case, the operator 90 manually operates the external controller and performs the teaching input while watching the image of the cooperative robot model 20M being displayed on the display section 83 of the head-mounted display 80.

In order to solve the issues in the present disclosure, various aspects and their effects can be supplied as described below. Note that, numbers in parentheses in the description of the following aspects correspond to reference signs of the drawings in the present disclosure.

For example, a first aspect of the present disclosure is a simulation device (50) for a simulation of a cooperative task carried out cooperatively by a cooperative robot and a person, and the simulation device (50) includes a head mounting-type display device (80) to be mounted on an operator (90) to simulatively carry out the cooperative task; a detecting section (70) configured to detect a position of the operator (90) in a real space; a three-dimensional model display section (502) configured to cause an image in which a robot system model including a cooperative robot model (20M) is arranged in a three-dimensional virtual space to be displayed on the head mounting-type display device (80); and a simulation execution section (503) configured to simulatively operate the cooperative robot model in the three-dimensional virtual space based on an operation program of the cooperative robot to carry out the cooperative task and a position of the operator (90) detected by the detecting section.

According to the first aspect, since the simulation can be performed while the operator experiencing a task that is cooperatively carried out by a person and a cooperative robot in a pseudo manner, it is possible to more efficiently prepare an appropriate operation program, a task procedure, and the like.

A second aspect of the present disclosure is such that the simulation device (50) of the first aspect further includes an operation path information display section (506) configured to acquire operation path information depicting an operation of the cooperative robot model (20M) from the operation program, and cause the operation path information to be displayed as an image in the three-dimensional virtual space before the cooperative robot model (20M) starts the above operation.

A third aspect of the present disclosure is such that, in the simulation device (50) of the second aspect, the operation path information includes at least one of an operation direction and a speed of the cooperative robot model.

A fourth aspect of the present disclosure is such that, in the simulation device (50) of the second or third aspect, the operation path information includes an operation trajectory of the cooperative robot model.

A fifth aspect of the present disclosure is such that, in the simulation device (50) of any one of the second to fourth aspects, the operation path information includes teaching points of the cooperative robot model.

A sixth aspect of the present disclosure is such that, in the simulation device (50) of any one of the second to fifth aspects, the operation path information includes a preview image of the above-described operation of the cooperative robot model.

A seventh aspect of the present disclosure is such that the simulation device (50) of any one of the first to sixth aspects further includes a distance calculation section (501) configured to calculate a distance between the cooperative robot model and the operator in the three-dimensional virtual space based on a position of the operator detected by the detecting section, and a warning message reporting section (507) configured to report a warning message in a case where the distance calculated by the distance calculation section becomes equal to or smaller than a predetermined value.

An eighth aspect of the present disclosure is such that, in the simulation device (50) of any one of the first to seventh aspects, the detecting section (70) is a vision sensor configured to visually detect the operator.

A ninth aspect of the present disclosure is such that, in the simulation device (50) of any one of the first to seventh aspects, the detecting section is a clothing-type detection device (170) configured to physically detect a motion of the body of the operator.

A tenth aspect of the present disclosure is such that, in the simulation device (50) of the ninth aspect, the clothing-type detection device (170) includes an actuator disposed at a position corresponding to each of a plurality of operation parts of the body, the simulation execution section (503) sends a detection signal to the clothing-type detection device (170) in a case where contact between a body part of the operator (90) and the cooperative robot model in the three-dimensional virtual space is detected based on a position of the operator (90) detected by the detecting section (70), and the clothing-type detection device (170) generates a load that is exerted on movement of the operator by actuating the actuator present at a position corresponding to the above body pare in response to the detection signal from the simulation execution section (503).

The invention claimed is:

1. A simulation device for a simulation of a cooperative task carried out cooperatively by a cooperative robot and a person, the simulation device comprising:
a head mounting display device to be mounted on an operator to simulatively carry out the cooperative task;
a detecting section configured to detect a position of the operator in a real space;
a three-dimensional model display section configured to cause the head mounting display device to display an image in which a robot system model including a cooperative robot model of the cooperative robot is arranged in a three-dimensional virtual space; and
a simulation execution section configured to simulatively operate the cooperative robot model in the three-dimensional virtual space based on
an operation program of the cooperative robot to carry out the cooperative task, and
the position of the operator detected by the detecting section, wherein
the detecting section is a clothing detection device configured to physically detect a motion of a body of the operator, and
the simulation execution section is further configured to send a detection signal to the clothing detection device in response to a detection of a contact between a part of the body of the operator and the cooperative robot model in the three-dimensional virtual space based on the position of the operator detected by the detecting section.

2. The simulation device according to claim 1, further comprising:
an operation path information display section configured to
acquire operation path information depicting an operation of the cooperative robot model from the operation program, and
cause the head mounting display device to display the operation path information in the three-dimensional virtual space before the cooperative robot model starts the operation.

3. The simulation device according to claim 2, wherein the operation path information includes at least one of an operation direction and a speed of the cooperative robot model.

4. The simulation device according to claim 2, wherein the operation path information includes an operation trajectory of the cooperative robot model.

5. The simulation device according to claim 2, wherein the operation path information includes teaching points of the cooperative robot model.

6. The simulation device according to claim 2, wherein the operation path information includes a preview image of the operation of the cooperative robot model.

7. The simulation device according to claim 1, further comprising:
   a distance calculation section configured to calculate a distance between the cooperative robot model and the operator in the three-dimensional virtual space based on the position of the operator detected by the detecting section; and
   a warning message reporting section configured to report a warning message in response to the distance calculated by the distance calculation section being equal to or smaller than a predetermined value.

8. The simulation device according to claim 1,
   wherein the clothing detection device includes an actuator disposed at a position corresponding to each of a plurality of operation parts of the body of the operator.

9. A simulation device for a simulation of a cooperative task carried out cooperatively by a cooperative robot and a person, the simulation device comprising
   a head mounting display device to be mounted on an operator to simulatively carry out the cooperative task;
   a detecting section configured to detect a position of the operator in a real space;
   a three-dimensional model display section configured to cause an image in which a robot system model including a cooperative robot model is arranged in a three-dimensional virtual space to be displayed on the head mounting display device; and
   a simulation execution section configured to simulatively operate the cooperative robot model in the three-dimensional virtual space based on an operation program of the cooperative robot to carry out the cooperative task and a position of the operator detected by the detecting section,
   wherein
      the detecting section is a clothing detection device configured to physically detect a motion of a body of the operator,
      the clothing detection device includes an actuator disposed at a position corresponding to each of a plurality of operation parts of the body,
      the simulation execution section sends a detection signal to the clothing detection device in a case where contact between a body part of the operator and the cooperative robot model in the three-dimensional virtual space is detected based on a position of the operator detected by the detecting section, and
      the clothing detection device generates a load that is exerted on movement of the operator by actuating the actuator present at a position corresponding to the body part in response to the detection signal from the simulation execution section.

* * * * *